United States Patent [19]

Cockett et al.

[11] 4,118,790
[45] Oct. 3, 1978

[54] DATA PROCESSING EQUIPMENT

[75] Inventors: Stewart Graham Cockett, Worplesdown, Nr. Guildford; Jeffrey Philip Taylor, London; Peter Craven, Welwyn Garden City; Alan Charles Farmer, Woodford Green, all of England

[73] Assignee: Post Office, London, England

[21] Appl. No.: 773,264

[22] Filed: Mar. 1, 1977

[30] Foreign Application Priority Data

Mar. 4, 1976 [GB] United Kingdom ............... 8672/76

[51] Int. Cl.² ........................................... G06F 7/02
[52] U.S. Cl. ................................... 364/900; 179/7 R
[58] Field of Search ... 364/900 MS File, 200 MS File; 179/7 R, 7 MM, 7.1 R

[56] References Cited

U.S. PATENT DOCUMENTS

| | | | |
|---|---|---|---|
| 2,668,875 | 2/1954 | Shepard | 179/7.1 |
| 3,284,777 | 11/1966 | Carlstrom et al. | 340/172.5 |
| 3,623,002 | 11/1971 | Mayne et al. | 340/172.5 |
| 3,931,614 | 1/1976 | Vasa et al. | 340/172.5 |

*Primary Examiner*—Gareth D. Shaw
*Assistant Examiner*—C. T. Bartz
*Attorney, Agent, or Firm*—Hall & Houghton

[57] ABSTRACT

Data processing equipment suitable for recording details of manually connected telephone calls has a plurality of operator stations with keyboards and VDU's connected in groups to operator's control units which respond to keyed instructions to obtain data from peripheral units storing such data and for recording on magnetic tape cartridge the details of the calls. The magnetic tape cartridge recording units are duplicated and the data to be recorded in the two units, which are separately generated and should be the same, are compared with one another and their validity checked. If both data are valid, whether they differ or not, they are recorded. If only one set of data is valid only the valid data are recorded by both recorders. A marker signal may be recorded to indicate that the data recorded may be incorrect.

9 Claims, 8 Drawing Figures

DATA PROCESSING EQUIPMENT

This invention relates to data processing equipment and is particularly useful for, but not limited in its application to, automatic call recording equipment for recording details of telephone calls to enable the charge for the call to be passed to the correct subscriber's account by an operator.

At present the details for a telephone call connected by an operator are written on a card or slip of paper which is passed to an accounts department for analysis and entry of the charge against the subscriber's account. Clearly the time taken to write the necessary information on the card to enable the charge to be assessed correctly and set against the correct account occupies a substantial proportion of the operator's time and consequently reduces the number of calls with which the operator can deal. Moreover, the entry of the call details by hand is liable to error and incorrect calculation of the charge or even its incorrect allocation. Any mistake of this type results in a loss of goodwill by the Post Office or other body operating the telephone service and could result in a loss of revenue.

It is therefore desirable to provide some form of data processing facility to enable the operator rapidly to enter the details of the call, but the system provided must be extremely reliable because it would be extremely expensive to retain the alternative handwritten system at present employed in addition to providing the data processing facility. It is moreover essential at present to check as far as possible that the operator has entered the correct information into the data processing system, and it is therefore desirable that the system could incorporate some kind of feedback display and any other check to which the information is susceptible.

It is an object of the present invention therefore to provide a data processing system suitable for recording details of telephone calls connected by an operator in which the above requirements have been taken into consideration.

According to the present invention there is provided data processing equipment having a plurality of on-line stations, the equipment including a data entry means and data utilisation means at each station, a plurality of data handling and/or storage units, a main data storage unit, and a plurality of control units each including storage means for recording in response to the data entry means details of a required data processing operation, each control unit including means for generating in response to the recorded details interrogation signals for the data handling and/or storage units, means for receiving data from the data handling and/or storage units in response to the interrogation signals and recording the data, means for applying signals to the data utilisation means, and means for generating signals representing the data processing operation and applying them to the main data storage unit, wherein the main data storage unit includes two independent recording means each including a buffer store connected to receive signals from the control units, a data recorder, and a recorder control means for controlling the recording by the recorder of the signals stored in the buffer stores, and the means for generating signals representing the data processing operation is arranged to generate two separate signals which are respectively applied to the two independent recording means, the control means of each independent recording means including comparison and testing means arranged to compare the signals representing the data processing operation and stored in the buffer stores of the two recording means and to perform a test of the validity of the signals stored on the buffer stores, the control means being arranged to permit the recording of the signals stored in the buffer stores by the data recorder, if they are the same in both of the recording means. If both signals are valid whether they differ or not they are both recorded. If one set of signals is invalid the valid signals are recorded by both recorders. If signals differ an indication of this fact is recorded together with an indication as to which, if either, is valid. Each station may be operated by an operator and may include display means for the operator.

The equipment may be used for recording for charging purposes details of telephone calls manually connected by the operators, and the application of signals for recording in the main data storage unit carried out on completion of the telephone call.

A marker signal may be recorded in response to the indications to indicate that the signals recorded may be incorrect. Alternatively, the indications can be used to produce an output from a monitor unit to enable an engineer to indicated any necessary repair and to mark the record produced.

The recording means may include a magnetic tape cartridge or cassette recorder, the cartridge or cassette being removable from the recorder for transport to an accounts department where the call details can be analysed and the appropriate accounts charged. Alteratively, other types of bulk data storage media could be employed.

In order that the invention may be fully understood and readily carried into effect an embodiment in the form of manually connected telephone call recording equipment will now be described with reference to the accompanying drawings, of which:

Figure 1:
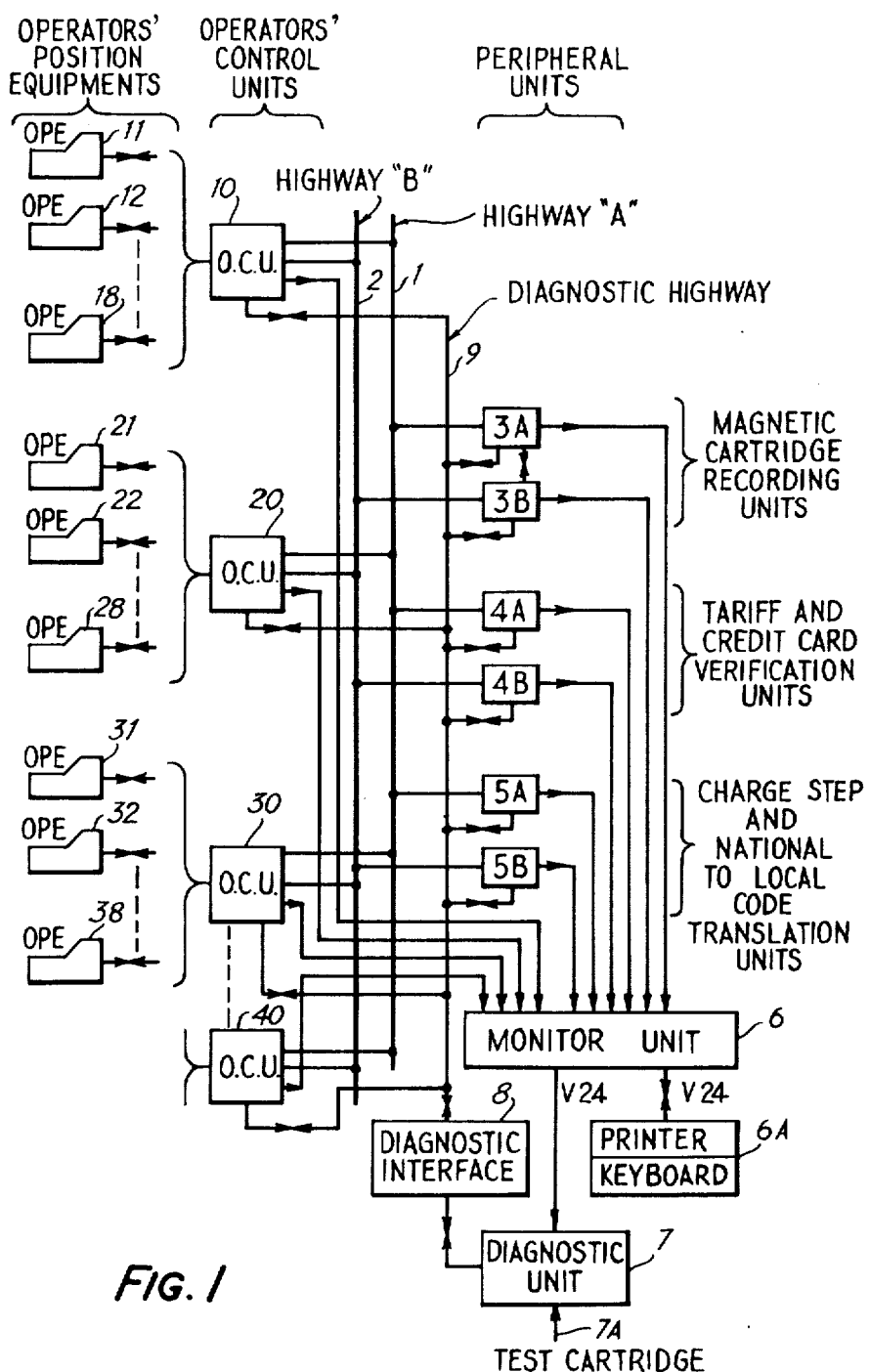
FIG. 1 shows in block diagrammatic form the telephone call recording equipment.

As shown in FIG. 1, the call recording equipment includes a plurality of operator's position equipments (OPE) 11 to 18, 21 to 28, 31 to 38, etc., each for an operator and which are connected to operator control units (OCU) 10, 20, 30, etc. Each OCU is arranged to receive information from and return information to eight OPE's divided into two groups of four OPE's. Each OCU has connections to two highways "A" and "B," having references 1 and 2, which highways are each connected to three pairs of peripheral units 3A, 3B, 4A, 4B, 5A and 5B, which consist of magnetic cartridge recording units, tariff and credit card verification units and charge step and national to local code translation units, which are respectively connected to the two highways. In addition each OCU 10, 20, 30, etc. is connected to a monitor unit 6 and the monitor unit 6 is also connected to the peripheral units to receive signals from them to indicate their functional state. The monitor unit has facilities for printing out details of any abnormalities in the operation of the equipment which it discovers during the periodical scanning of the outputs of the OCU's and peripheral units. There is also provided a diagnostic unit 7 which is connected to receive the information recorded in the monitor unit and to operate a diagnostic interface unit 8 for applying test signals via a diagnostic highway 9 to the OCU's and peripheral units and for receiving reply signals over the same highway for the purpose of assisting an engineer to discover the reason for any faults which occur.

The components which form the OPE's need not all be located at the operator's switchboard, but will include key pads for operation by the operator and a visual display unit (VDU) for providing information in visual form for the operator. The necessary logic and interface circuitry may be provided at the operator's position or in the corresponding OCU. The key pads may be entirely separate from the keys and switches provided for control of the telephone network by the operator but preferably there will be some interconnection between these components to ensure that the exact time from the connection of a call to its disconnection are fed to the OCU, possibly together with details of the number to be called and the facility required by the subscriber. The operator control unit is constructed to transmit the information required by the operator to the visual display unit, possibly also to illuminate certain of the keys to provide some of the information required or for prompting the operation of certain keys and also to check the correct operation of the components of the OPE.

As mentioned above, each OCU is connected to control eight OPE's, but the OCU's are constructed to be capable of handling information from and feeding information into twelve OPE's; each OCU having two groups of four buffer stores, each buffer store being available for the information from and to a respective OPE, and two stand-by units each for handling the input of four other OPE's or for transferring a group of four OPE's to an adjacent OCU. In the event of a breakdown of an OCU when discovered by tests performed internally by each OCU, the eight OPE's allocated to that OCU are divided into two groups of four and transferred to two adjacent OCU's. Each OCU contains a microprocessor which, in the particular example of the invention being considered is an INTEL 8080A or a compatible device, and resembles a small computer in which the required data processing is effected by a single integrated circuit. It will be apparent that other types of microprocessor could be used, provided that the facilities required by the OCU are available. There are associated with each microprocessor the necessary power supplies, clock pulse generators, data and programme stores and buffer stores.

As can be seen from FIG. 1, each of the peripheral units is provided in duplicate, and each unit includes a microprocessor similar to that used in the OCU's. The tariff and credit card verification units 4A and 4B store the information about the tariff rates of the different telephone connections possible or other facilities such as, for example, provision of personal call, etc. As the tariff rate will depend upon the time of day at which the call is made, these units will also include independent clocks driven by so-called watch-dog timers and supplying this time so that the correct tariff rate for the call is provided and is transferred to the OCU. Facilities are provided for resetting the clocks under engineer control. As certain subscribers require the facility for charging telephone calls to a credit card account, it is necessary for the operator to be able to check the validity of the credit card number given by the caller, and for this purpose the tariff and credit card verification units are able to check the number and indicate to the operator whether the number given is valid or invalid. These units may also provide other information such as, for example, when a particular account has been discontinued.

Another facility provided by the peripheral units is found in units 5A and 5B and is the charge step data and national to local code translation information which are used for providing information to the operator with regard to dialling codes to be employed for particular operations or connexions, and tells the OCU the distance factor in the connexion being made so that the appropriate charge rate is used.

In addition to providing tariff data and the credit card verification, each of the units 4A and 4B includes a clock giving the time of day, this information being required because the call tariff depends on the time at which the call is made. The clocks in the two units are independent but are checked against each other every 30 minutes and if the error is greater than 30 seconds a signal indicating this is sent to the monitor unit 6 for reporting to the engineer. On receiving the report the engineer uses the diagnostic unit 7 to reset both clocks to the time provided by a reference clock.

The most important task of the peripheral units is fulfilled by the magnetic cartridge recording units 3A and 3B which record in duplicate on two separate magnetic tape cartridges details of the calls handled by the operator, together with the subscriber's identification either by way of his telephone number or credit card number, for example. On to the cartridge are also recorded the length of the call, the time of day, the tariff unit and any other details such as if the call is a personal call. When a magnetic cartridge has been filled or at the end of a particular period the cartridge is replaced and the full cartridge is passed to a central accounting department where the charges for the calls ae calculated and set against the subscribers' accounts.

All of the peripheral units are duplicated as are the highways 1 and 2 coupling them to the OCU's so as to ensure that a single fault cannot disable any part of the system. Moreover, it is possible for a faulty unit to be tested and repaired without interrupting the efffectiveness of the system as far as the operators are concerned. To enable the engineers rapidly to locate and repair faults in any part of the system, there is provided the monitor unit 6 which is connected to each OCU and each peripheral unit via a system of independent highways which enable the performance of each unit to be assessed in response to relevant parameters such as, for example, the state of fill of buffer stores provided in the units. In addition, the microprocessors in the units are programmed to assess their own functioning and to transmit a message that all is well or that there is a fault with the particular unit perodically to the monitor unit. In one example reporting messages are applied to the monitor unit from each of the OCU's and peripheral units every four seconds. The monitor unit provides a printed output by means of a teleprinter 6A, which output will enable the overall performance of the system to be checked and will also provide statistical information which will enable decisions to be made as to the necessity for further operators or other peripheral units to be provided or not.

When the monitor unit 6 is not able to identify precisely the faulty equipment, a maintenace engineer is able to use a diagnostic unit 7 which includes a further microprocessor and has a large repertoire of diagnostic instructions available on test cartridges which can be inserted in the unit 7 at 7A. The diagnostic unit 7 is designed to diagnose and localise faults in any of the units and is arranged to do this in such a way that it can be utilised by non-specialist staff who have no knowledge of the data processing equipment included in the system. In order to perform the diagnosis the unit 7 initiates a test signal which is applied over a diagnosis highway system 9 via an interface 8 either to the operator control units or to the peripheral units and appropriate output signals are returned to the diagnostic unit 7 over the same highway system 9 and interface 8. The teleprinter 6A enables the engineer to enter instructions and data via its keyboard and prints out the results. The teleprinter 6A is connected to the monitor unit 6 via a V24 link, a second such link connecting the unit 6 to the diagnostic unit 7.

Another function of the diagnostic unit 7 is to enable data to be entered into the tariff and credit card vertification units 4A and 4B, since it is likely that the credit card data at least will be changed frequently.

The CPU's may break down in service and therefore are programmed to carry out periodic checks to supervise their operational condition and that of the units which they control. To achieve this each unit includes a watch-dog timer which consists of a counter to which pulses are applied having repetition frequency of 1 kHz. The programmes of the microprocessor included in the unit are arranged to access the counter at intervals not greater than a quarter of a second and to reset it to a count of 0. If the counter is not accessed during this time, for example by reason of a failure of the programme to extricate the microprocessor from the loop of instructions or as a result of hardware failure in the microprocessor, the counter, when not accessed, starts a "time out" to allow a further period of time for the counter to be accessed. Failure to access the counter within this further period of time results in the programmes of the microprocessor being interrupted and being reset to a datum position in the programme sequence. A flag is set when the programme interruption occurs and signals are sent to the monitor unit to cause it to record the details of the failure. A second failure to access the counter within the quarter second time interval results in the unit being recorded as having broken down, and at this time if the unit is an OCU a switch over of the OPE inputs to adjacent two OCU's is effected.

As described above each OCU receives inputs from eight OPE's but are capable of receiving inputs from twelve OPE's. Consequently on the breakdown of an OCU the OPE's normally associated with it are transferred as two groups of four to respective other OCU's so as to make their complements up to twelve.

The inputs from the OPE's to the OCU's are fed in groups of four to respective "first in first out" buffer stores included in OPE common units. If either of these buffer stores becomes filled it is assumed that for some reason the OCU has broken down and is unable to handle the inputs. In the same way as described above a breakdown is indicated and is also dealt with by transfer of the OPE's to adjacent OCU's. As before an indication is sent to the monitor unit 6 to record the failure of the OCU.

The entire system is constructed so that every part is at least duplicated with the result that signals can be rerouted to other units in the event of a breakdown. As described above the OCU's are arranged so that their functions can be taken over by other OCU's in the event of failure and the peripheral units are also duplicated so that if one unit fails the duplicate is able to continue performing the required function. Each OCU is programmed to receive a response over each of the highways "A" and "B" from the units to which is has sent an enquiry, one response coming from the unit connected to highway "A" and one from its duplicate connected to highway "B". The OCU then compares the responses and takes the decision as to which signal is correct, if they differ. The signals include simple check information such as one or more parity digits to enable a validity test to be made on the data so that obviously invalid data can be discovered without difficulty. On the other hand if an OCU receives responses which differ but both of which appear to be valid it produces a signal for the operator concerned indicating that it cannot accept the data because it cannot decide which is correct. Under these conditions the operator must revert to the usual reference books for ascertaining the information required. Any failure of this kind is automatically reported to the monitor unit and the engineer is then able to carry out tests to ascertain which part of the system has failed and to restore it to full operation again.

In addition the magnetic recording cartridge units 3A and 3B which are also provided in duplicate and connected respectively to the highways "A" and "B", have a checking unit connected in their inputs to ensure that the data recorded on the cartridges are as far as possible correct. In the input to each unit there is provided a "first in first out" (FIFO) buffer and the data stored in these buffers are compared. If the data are identical in both buffers than the recording units are arranged to record the data. If the data in the two buffers differ then each is tested for validity on the basis of a simple check, for example a parity check, and if one set of data is wrong then the valid data are recorded in both units. On the other hand, if the data differ but both sets of data appear to be valid then each recording unit is arranged to record the data stored in its own buffer and an indication is sent to the monitor unit to indicate that the two sets of data differ. It is also possible that a mark of some kind be entered on the records at this point to indicate that the data immediately preceding the mark or immediately following it are suspect.

Figure 2:
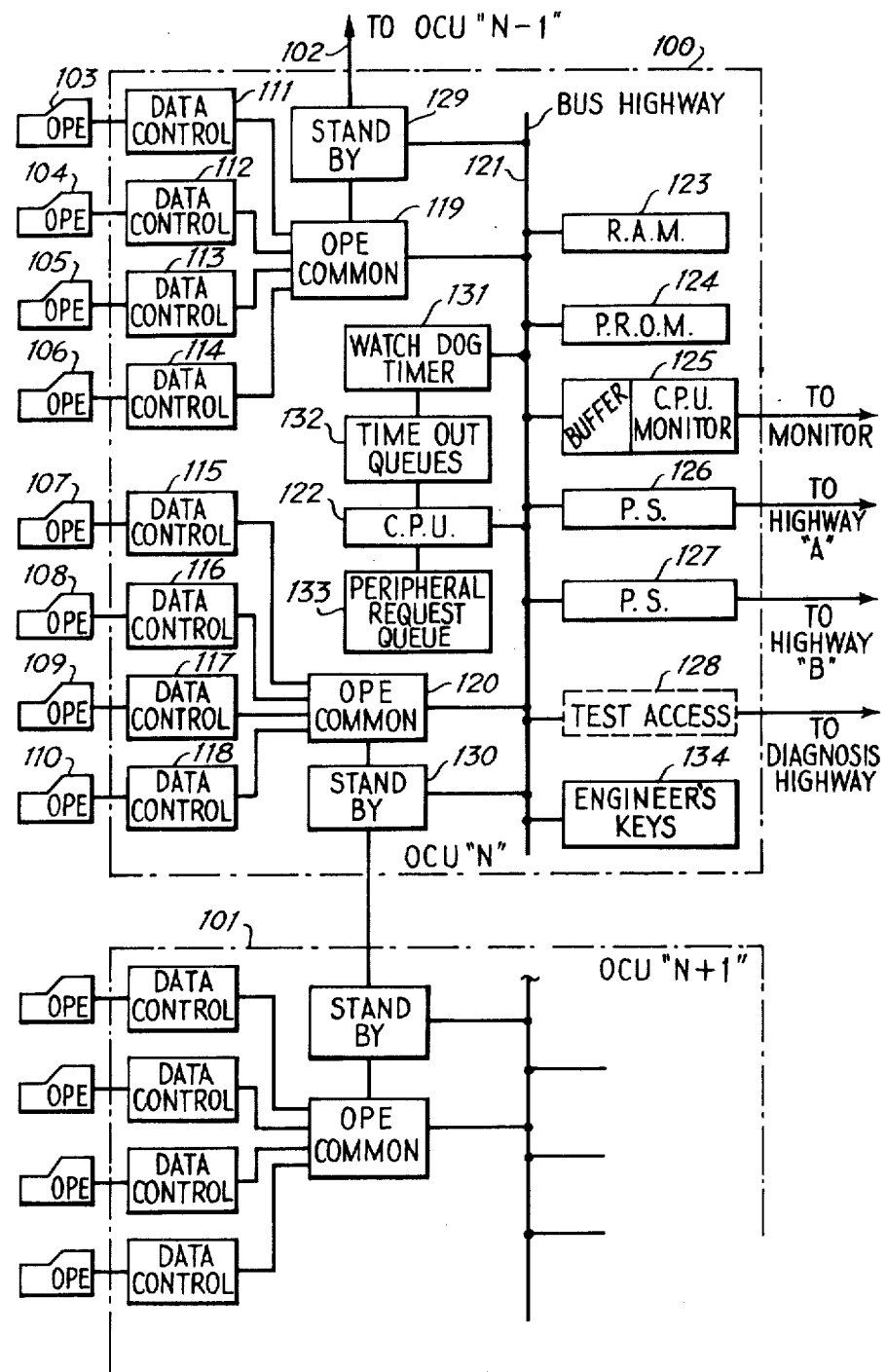
FIG. 2 shows in block diagrammatic form the circuit of an operator's control unit (OCU)

FIG. 2 shows the construction of an operator's control unit (OCU) and its connection to eight OPE's and to two adjacent OCU's for the purpose of handling over the OPE's in two blocks of four to the adjacent OCU's in the event of a breakdown. The same interconnection between the OCU's is used for the handling over by one of the adjacent OCU's of a block of four OPE's, should the particular adjacent OCU break down. The dotted rectangle 100 encloses the components constituting an OCU number N, part of OCU number N+1 being shown partly enclosed by dotted line 101, and a connection to OCU N−1 being indicated at 102. In addition to the components shown or indicated, each OCU includes power supplies and a pulse generator which supplies the signals required by the microprocessor.

The eight OPE's allocated to the OCU "N" are indicated as 103 to 110 and are connected to respective data control units 111 to 118 in the OCU. The data control units have some buffer storage and other functions such as checking the validity of the signals received from the OPE's and performing some code conversions, for example. The data control units are connected in groups of four to OPE common units 119 and 120 by means of which the signals from the OPE's are multiplexed for application to a bus highway 121 which forms the main communication link between the microprocessor and its associated units. Each OPE common unit includes a "first in, first out" (FIFO) buffer store (see FIG. 8) for receiving data and intructions from the OPE and enabling them to be retimed for processing by the microprocessor in the OCU.

The microprocessor itself is contained in a central processing unit (CPU) 122 and is connected by means of the highway 121 to a random access memory (RAM) 123, a programmable read-only memory (PROM) 124, a CPU monitor 125, and two peripheral unit selectors (PS) 126 and 127. In addition, facilities are provided for plugging in a printed circuit board "test access" 128 for coupling the diagnostic unit into the OCU. The CPU monitor 125 is connected directly to the monitor unit (FIG. 1) and the peripheral unit selectors 126 and 127 are connected respectively to the highways "A" and "B" (FIG. 1).

Stand-by units 129 and 130 are connected respectively to the OPE common units 119 and 120 and also to the bus highway 121. Unit 129 is connected via connection 102 to OCU "N−1" and the unit 120 is connected to OCU "N+1."

Associated with the CPU 122 and possibly incorporated in the microprocessor (but shown separately from the CPU for clarity) is a watch-dog timer 131, and in the RAM 123 by software time-out queues 132 and a peripheral request queue 133, the functions of which will be described later. Engineer's keys 134 are provided connected to the bus highway 121 for enabling an engineer to have direct control of the OCU should he require it. A power supply unit and a pulse generator, neither of which are shown, would be provided to drive and energize the components of the OCU.

The CPU 122 performs the processing of the signals from the OPE's, transferring enquiries to the various peripheral units as required in the following way. The operations of the CPU are divided into 16 multiplexed time slots of which 12 are allocated to the 12 OPE's (the eight OPE's normally handled by the OCU plus the 4 extra OPE's taken over if the adjacent OCU fails), one is allocated to the watch-dog timer and the time-outs (indications that specific time intervals have elapsed), two are allocated to the peripheral selectors and one is allocated to the engineer's keys via which the engineer can enter data or special instructions into the OCU. It will be appreciated that buffer stores must be employed with a processor operating in this way because the actual time of making use of or producing any particular item of data depends on the time slot to which it relates. If a signal from an OPE is held in one of the buffers in the OPE common units 119 and 120, the CPU 122 at the appropriate time slot responds to the signal to record the data or start processing in a conventional manner, that is to say using storage registers in the RAM 123 allocated to the particular time slot to store the data and initial and intermediate results of calculations in response to instructions derived from the PROM 124. A typical signal from an OPE would be a request for data from one of the peripheral units, and the CPU would respond to such a signal by attempting to pass on a request for the data to the peripheral unit concerned. Probably the peripheral unit would not be accessible at the particular instant and therefore the request would be placed at the end of the queue stored in the peripheral request queue store 133, and when the request reaches the head of the queue the details are selected by the CPU 122 from the RAM 123 and passed via the selectors 126 and 127 to the peripheral unit concerned. The data received from the peripheral unit would be routed by the CPU 122 into the RAM 123 ready for return to the OPE. Each OCU is able to handle 84 calls at a time, i.e. 7 calls from each OPE, and the data stored in the peripheral request queue takes the form of a call tag, that is to say a number between 1 and 84, by which the call concerned is known to the OCU.

The timing of operations is controlled by a pulse generator, not shown, from which pulses are applied to the watch-dog time 131, which in turn applies signals to the time-out queues stored in the unit 132. The function of the time-out queues is to produce signals after particular intervals of time, such as, for example, 3 minutes for the call time from a public call box, which interval forms the unit of time for a pre-paid call. As described above, the watch-dog time 131 includes a counter which is reset to zero every time the timer is accessed, so that in the event of a breakdown of the normal sequence of instructions of the CPU 122 which results in the timer 131 not being accessed, the counter would reach a value higher than it would reach in normal operation, thus providing an indication of the breakdown and in response to which the programmes of the CPU 122 are reset to a datum position and restarted.

In addition to monitoring the satisfactory functioning of the OCU by means of the watch-dog timer, the monitor 6 is arranged to receive from the OCU periodic signals produced during programme execution indicating its satisfactory operation and also statistical data relating to the calls which it has handled. Items of statistical data are applied by the CPU 122 to the buffer in the unit 125 during the time slot allocated to the CPU monotor, so that during the operation of the exchange the statistical data is built up in the monitor unit 6.

The sixteenth time slot is available for the engineer's keys 134 in the event of a breakdown of the CPU, thus enabling the engineer to instruct the CPU 122 directly and diagnose the cause of any faults or failures in the OCU.

Amongst other storage facilities provided by the RAM 123 is a call store having 84 addresses, one for each call, in which details of the calls are recorded as they are entered by the operator. When the call is completed the relevant details are sent by the CPU to the magnetic cartridge units 3A and 3B for charging and to the monitor unit 6 for statistical purposes. An operator's position store is also included which relates the switches at the operator's position to the call tag or number.

In the event of breakdown of the OCU "N," detected either by the watch-dog timer or by the filling of one or more of the input FIFO buffers in the data control units, the CPU monitor 125 sends signals to the stand-by units 129 and 130 causing them to route the outputs of the OPE common units 119 and 120 to the stand-by units in the adjacent OCU's. The CPU's in the OCU's are programmed to test the stand-by units in each multiplex cycle to ascertain whether signals from four extra OPE's are being applied to the OCU or not. If the four extra OPE's are allocated to a particular OCU then its CPU will address the extra OPE's in the same way as the original eight OPE's allocated to the OCU so that the operations required by the extra OPE's are fitted into the schedule of work performed by the OCU.

Figure 8:
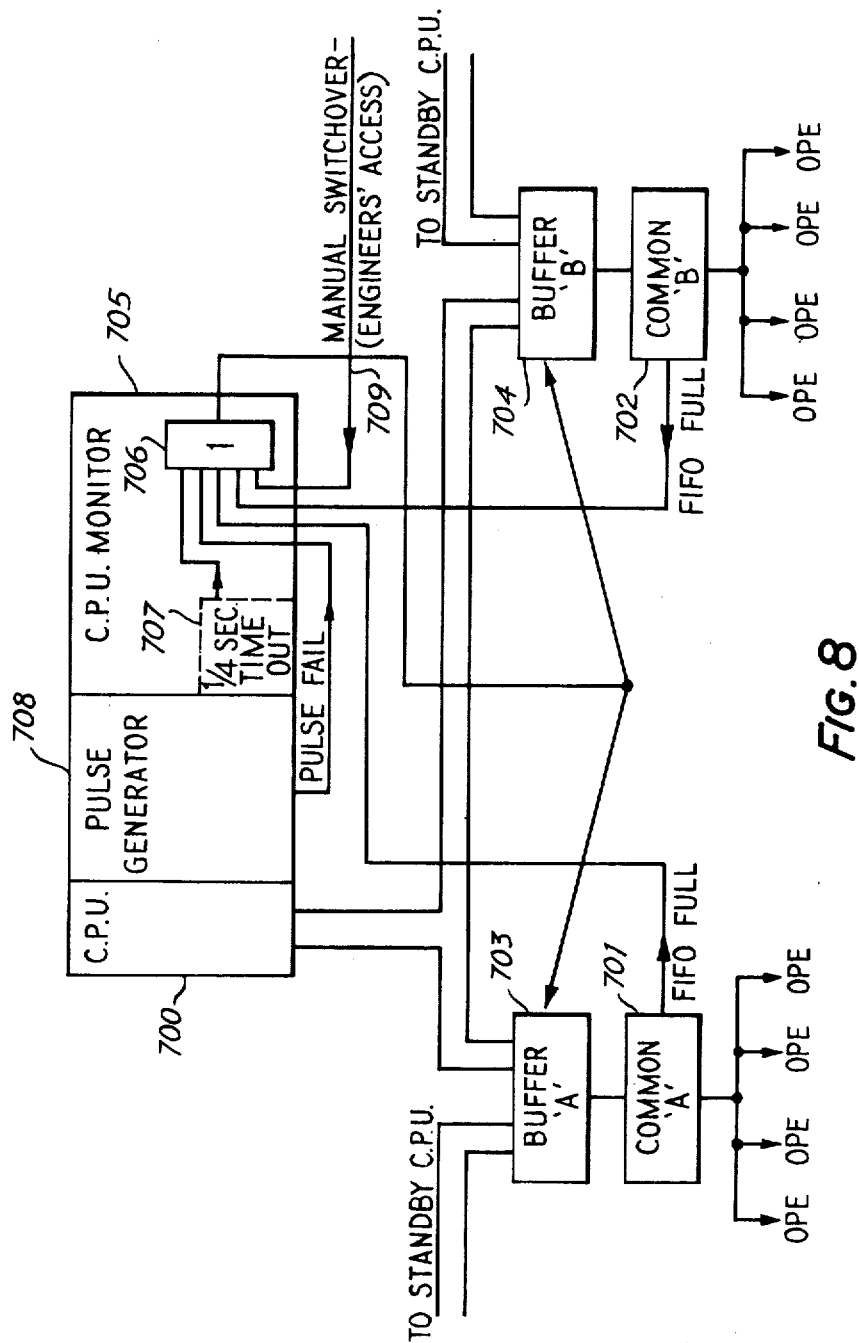
FIG. 8 shows details of the OCU switchover circuits.

FIG. 8 shows further details of the mechanism in an OCU to provide for the changeover of groups of OPE's to adjacent OCU's. Two groups of four OPE's are connected via two FIFO common buffers 701 and 702 respectively to storage buffers "A" and "B" having the references 703 and 704. The buffers 703 and 704 each have two outputs of which one is connected to CPU 700 belonging to the OCU in question, and of which the other is connected to a respective stand-by CPU belonging to an adjacent OCU. A CPU monitor unit 705 contains an OR-gate 706 having inputs from the FIFO buffers 701 and 702 if these become full, an input from a ¼ second time-out unit 707 included in the CPU monitor 705 and an input from a pulse generator 708 which supplies energizing pulses to the CPU 700 indicating that one or more sequences of pulses has failed. A further input 709 is provided to enable an engineer to check the switch-over operation manually. The output of the gate 706 is connected to the buffers 703 and 704 to effect the switch-over control of these buffers to or from the stand-by CPU's.

Figure 3:
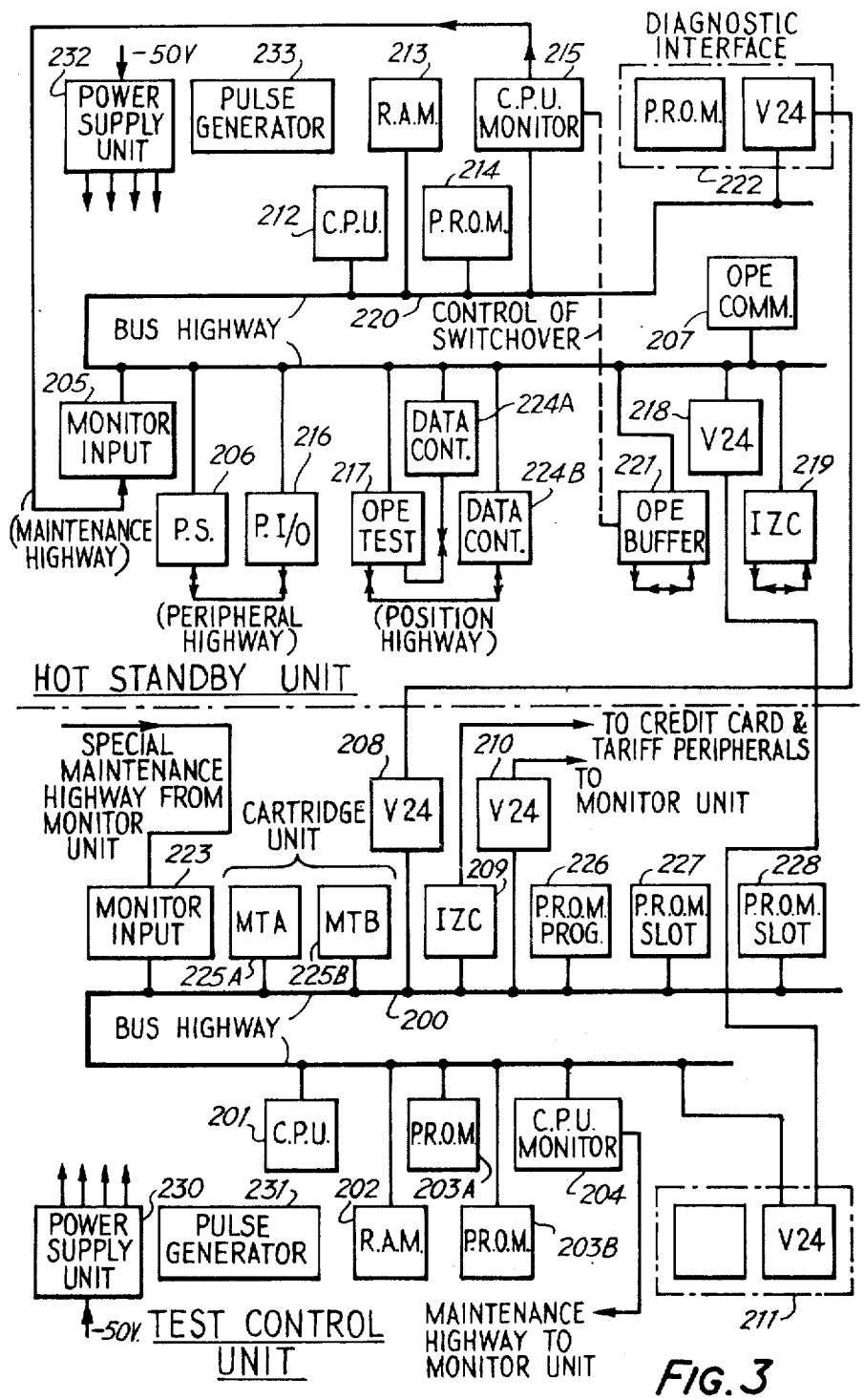
FIG. 3 shows the circuit of a diagnostic unit.

FIG. 3 shows the details of the diagnostic unit (FIG. 1) from which it can be seen that the unit consists of an active part termed a test control unit and formed by units below the broken line which are connected to a bus highway 200 and a passive part termed a hot stand-by unit and formed by the units above the broken line and connected to a bus highway 220. The units forming the passive part are on "hot stand-by;" that is to say they are in operation repeatedly undergoing a sequence of tests under the command of the CPU's 201 and 212, so that an engineer can extract one of the units for use in the equipment following a breakdown secure in the knowledge that the unit he has taken is fully operational, whereas a unit idle on a shelf may have a fault.

Units CPU 201, RAM 202, PROMs 203A and 203B, and CPU monitor 204 constitute a data processing unit, such as is used in many units in the system, controlling the tests performed by the diagnostic unit, and these units are interconnected by the bus highway 200. Also connected to the bus highway 200 are a V24 unit 208 the function of which will be described in detail later, an interzone channel 209 which is connected to the tariff and credit card verification units 4A and 4B for the purpose of entering specific data into those units, and a second V24 unit 210 which connects the test control unit directly to the monitor unit 6 for the purpose of receiving instructions from that unit as mentioned above. A special maintenance highway from the monitor unit 6 is connected through a monitor unit 223 to the bus highway 200, and magnetic tape cartridge units 225A and 225B are provided to enable an engineer to enter quickly special instructions or data for diagnostic test procedures. The blocks 226, 227 and 228 indicate possible positions for other PROMs for diagnostic test programmes. A further V24 unit included within the dotted rectangle 211 is also connected to the bus highway 200 and together with the V24 unit 208 provides the double interconnection of the hot stand-by unit with the test control unit, the two V24 units being respectively connected to the bus highway 220 by means of V24 units 218 and that included in diagnostic interface 222. The interface 222 can be detached from the highway 220 and connected to the bus highway of any other unit in the system, the connection being indicated on the diagrams of these units as test access so as to enable the test control unit to have access to the components of the particular unit to enable diagnostic test procedures to be carried out.

The hot stand-by unit, as explained above, contains a number of components, for example, in the form of printed circuit boards, which are continually exercised under the control of a CPU 212, a RAM 213 and a PROM 214, all of which are connected to the highway 220. The components themselves are a peripheral selector 206, an OPE common unit 207, a peripheral input-output unit 216, an OPE test unit 217, two data controllers 224A and 224B, an interzone channel 219, an OPE buffer 221, and a monitor input unit 205 connected to a CPU monitor unit 215. In order to permit these units to interact in the manner in which they are constructed to do when in service, apart from the connection of the CPU monitor 215 to the monitor input unit 205 mentioned above, the peripheral selector 206 is connected to the peripheral input-output unit 216, the OPE test unit 217 is connected to the data controllers 224A and 224B, the interzone channel 219 has its outputs interconnected as are the outputs of the OPE buffer 221 which is controlled by the CPU monitor 215 to effect the switch-over of this buffer as described with reference to the buffers 703 and 704 of FIG. 8.

Power supply units 230 and 232 and pulse generators 231 and 233 are provided respectively for the test control unit and the hot stand-by unit, which two units are constructed of similar components so as to standardise their assembly.

The diagnostic unit provides the following facilities:
1. Storage for range of detail diagnostic programmes.
2. A facility to keep a stand-by including one of all basic system cards in hot proven state, with alarm if a failure occurs in one of the stand-by cards.
3. Engineer access to control diagnostic programmes and produce as an output the results of those programmes. This access is via the teleprinter 6A on the monitor unit through a V24 link between the monitor unit and the diagnostic unit.
4. A facility for inputting and loading secured data tables, e.g. tariff data, translation data and credit card stop list.
5. A facility to resynchronise the 2 real time clocks in the tariff peripheral equipments.

The diagnostic interface unit 8 provides the following facilities:
1. An ability to interrupt the programmes of an addressed CPU to run a test programme derived from a PROM included in the unit 8.
2. Running the PROM programme to test out basic CPU, pulse generator and RAM combination of an addressed unit.
3. Provide access for the addressed CPU to read programmes from the diagnostic unit.

When a fault occurs the monitor unit 6 will indicate at least which unit, i.e. OCU, peripheral zone, has failed or at best which card has failed. The diagnostic interface will then be plugged into the faulty unit. The interrupt is then operated to start the CPU reading the diagnostic PROM programme by engineer control at the teleprinter 6A. If this fails to identify the fault then one of the following cards has failed.

1. the power supply, separately alarmed hence such a failure will be self evident.
2. the pulse generator — there is an alarm on the slowest clock pulse i.e. a failure will normally affect the slowest clock pulse and hence indicate the failure by alarming.
3. the RAM card — normally 2 RAM cards are used hence by testing with the other RAM card a good test can be run, if the fault is in the RAM card.
4. the CPU.

From this information a fault that is not already evident or can be cleared by attempting to run the other RAM card, will normally be in the CPU. By using the hot stand-by CPU from the diagnostic unit, the test can be re-run. Another failure may be caused by the pulse generator, otherwise it is a very unusual fault consisting of a continuous corruption on the bus highway. This can be proved by placing the suspected faulty CPU in the hot stand-by position to see if it runs successfully. If it runs correctly then it is a highway fault. Once a good CPU, pulse generator, power supply and RAM have been established tests can be run to test the PROM, CPU monitor and input/output devices. In this way the fault can very easily be reduced to a single card. Several cards may have to be removed and replaced if the fault is in the pulse generator or power supply and does not generate the alarms on these cards, or there is a fault interfering with the bus highway, which may require a number of cards to be disconnected to clear persistent interference then by testing as the cards are reconnected the faulty card can be isolated.

Figure 4:
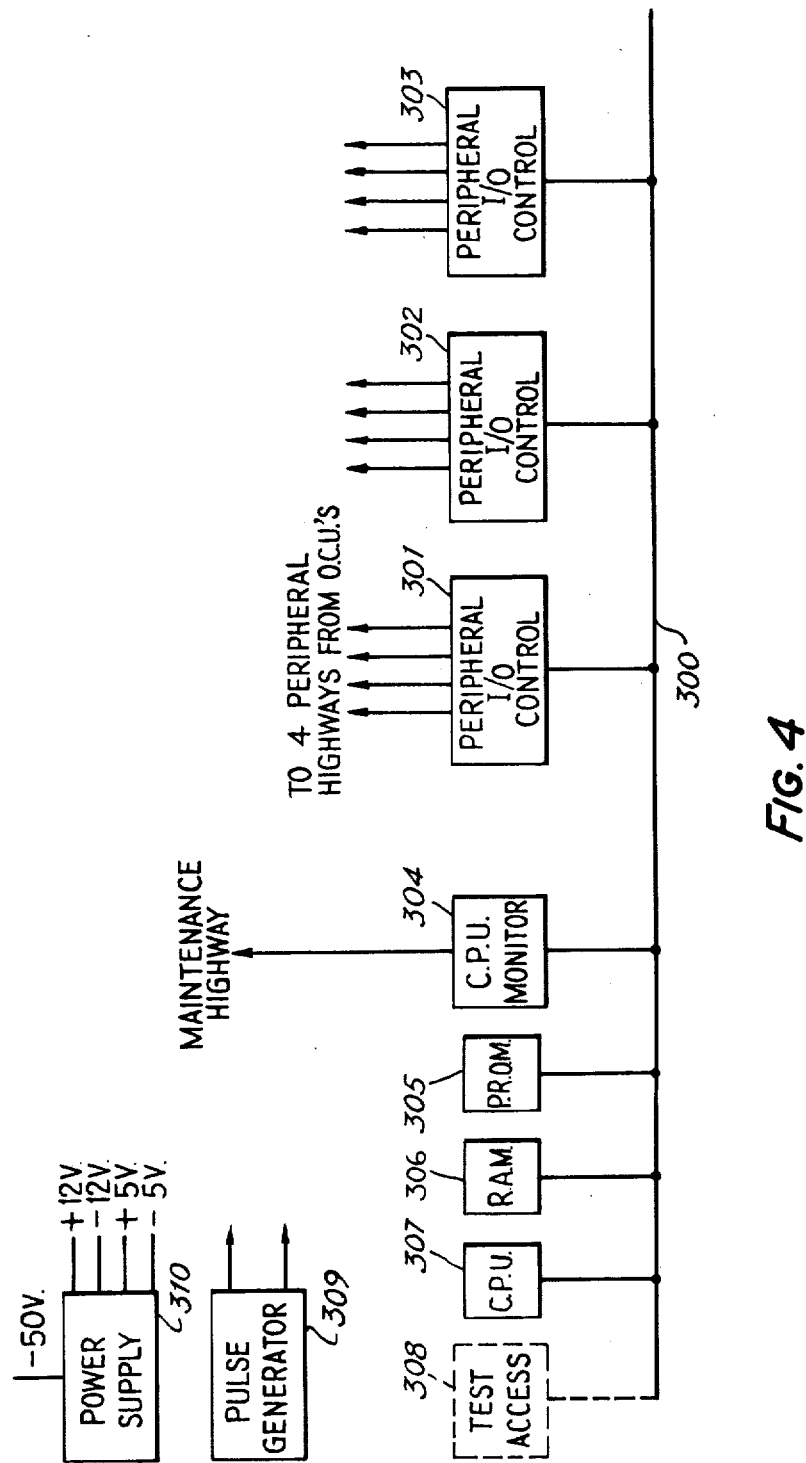
FIG. 4 shows the circuit of a peripheral unit other than a magnetic cartridge recording unit.

FIG. 4 shows the circuit of any of the peripheral units, except the magnetic cartridge recorder. The peripheral units differ only in the programming of the read-only memories. As can be seen the construction shown in FIG. 4 is similar to that of other units, such as the operator control units and the diagnostic unit, as far as the data processing part of the circuit, formed by CPU 307, RAM 306, PROM 305 and CPU monitor 304, is concerned but differs in the provision of three peripheral I/O control units 301 to 303 connected to the bus highway 300. Each peripheral I/O control unit is connected to groups of the OCU's (FIG. 1).

Figure 5:
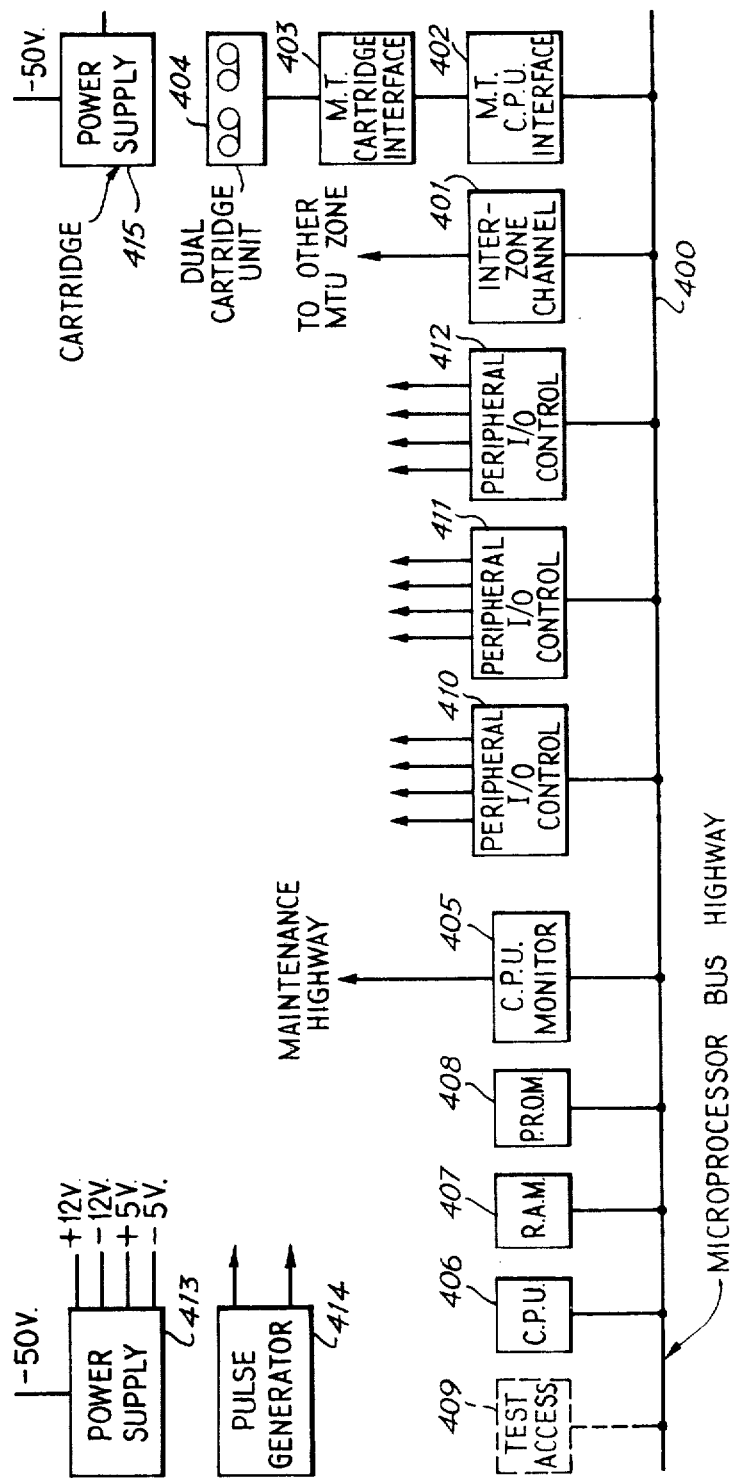
FIG. 5 shows the circuit of a magnetic cartridge recording unit.

The circuit of the magnetic cartridge recorder is shown in FIG. 5 and is similar to that shown in FIG. 4 with the addition of an interzone channel unit 401 and magnetic tape to CPU and magnetic tape cartridge interfaces 402 and 403 and a dual tape cartridge unit 404. A power supply for the cartridge unit is provided by unit 415. The units 401 and 402 are connected to the bus highway 400. Also connected to the bus highway 400 are three peripheral I/O control units 410, 411 and 412, CPU 406, RAM 407, PROM 408 and CPU monitor unit 405. As was explained earlier the data applied via highways "A" and "B" to the magnetic tape cartridge units are compared, and this is the function of the interzone channel unit 401 together with a similar unit in the other magnetic cartridge unit (the peripheral units are referred as belonging to zone "A" or zone "B" depending on the highway to which they are connected). The unit 404 is a dual cartridge unit to permit the magnetic cartridge to be changed without interfering with recording. A power supply 413 and a pulse generator 414 are provided to energize the circuits.

Figure 6:
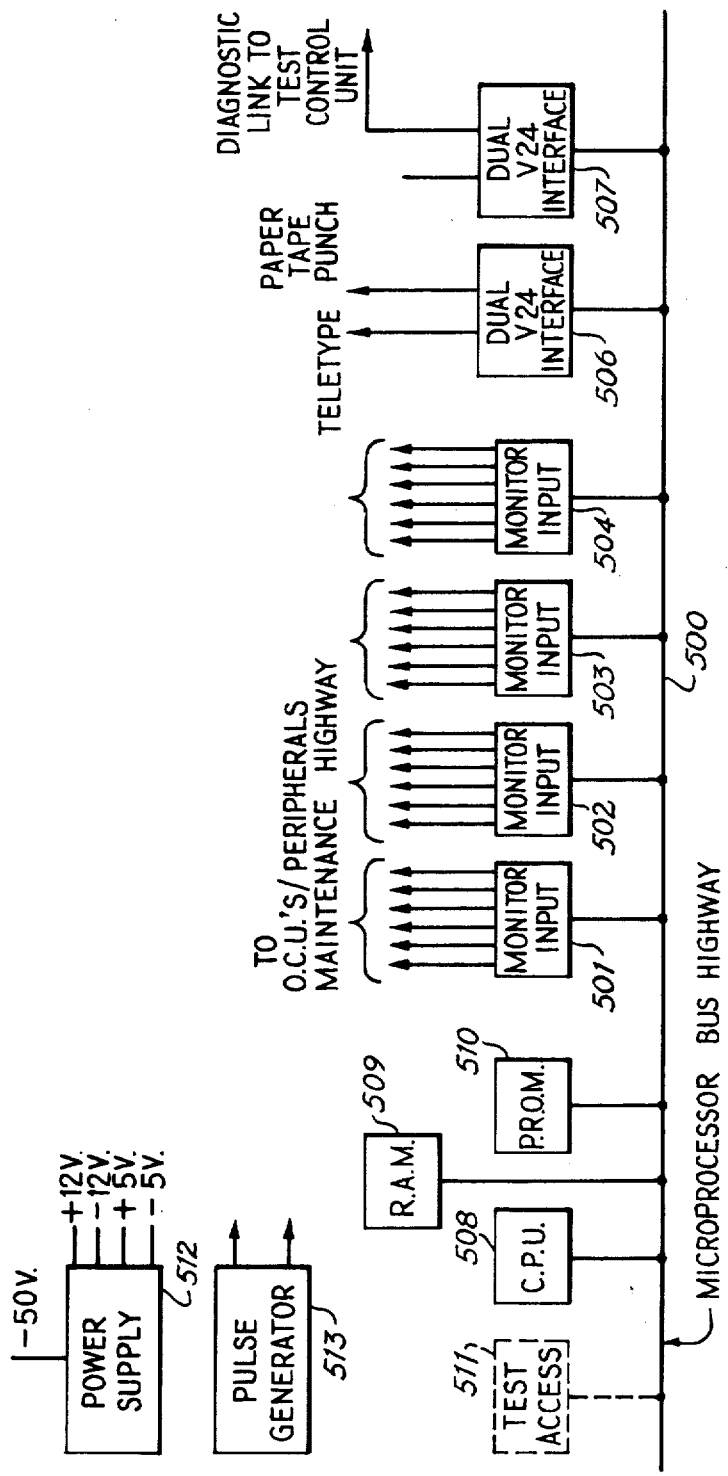
FIG. 6 shows the circuit of a monitor unit.

The monitor unit is shown in FIG. 6 and again utilises the same data processor construction, with a CPU 508, a RAM 509 and a PROM 510 connected to a bus highway 500, but in this unit four monitor input units 501 to 504 are provided connected to the bus highway 500, the monitor input units having direct connections to the rest of the equipment shown in FIG. 1 for the purpose of receiving the signals from the CPU monitor units.

In addition two dual V24 code interface units 506 and 507 are provided for connecting the monitor unit to a teletype printer a paper tape punch and the diagnostic unit.

A power supply 512 and a pulse generator 513 are provided.

The monitor unit 6 receives data from OCU's and peripherals which can be divided into two types. These are statistics and difficulty information from OCU's and fault reports from OCU's and peripherals.

The unit 6 produces statistics and difficulty information as both print-out and punched tape information. Depending on the size of the installation the print-out will be on the printer 6A or on a separate dedicated printer (not shown). If a separate printer is used the engineer will need to key a specific instruction to define this. The main bulk of statistics is not required regularly and will only be provided when a marker is set by an engineer request via the maintenance printer. The information required at all time includes:

the total number of statistics messages received from OCU's for every 15 minute period, the percentage of calls answered in 15 seconds (accurate to one decimal place) for every 15 minute period as obtained from Q COUNT circuits, and the average number of positions staffed for each 15 minute period. When each operator starts work on a switchboard a "HEADSET IN" signal is sent to the OCU and when she leaves the switchboard a "HEADSET OUT" signal is sent. The OCU sends the monitor unit a message every 16 seconds which includes the switchboards in service. The monitor unit marks a pointer for each position on receipt of this information and averages the number of in use positions over a 15 minute period.

This statistical information is generated and stored in a "Stats Output Buffer" every 15 minutes and once every 4 hours all the data in the buffer is printed out with appropriate statements to explain the meaning of the data.

Part of the maintenance control provided by the monitor unit 6 is a check on the tariff units 4A and 4B to ensure the two real time clocks are in sync. The tariff units send messages to the monitor units every ¼ hour containing a number in the range 0 to 95 identifying the past ¼ hour in a 24 hour period, and the date.

As well as the print-out, all the information is punched on paper tape. A tape punch will be provided at every installation but a dedicated printer for the print-out will only be provided on larger installations. Conflict may occur between the maintenance and statistical uses of the monitor unit 6 and also of the diagnostic unit 7 and a routine could be devised for dealing with these.

Difficulty messages are received from the OCU when the operator wishes to record either a subscriber's or her own difficulty in setting up calls in the telephone network. This information is useful to maintenance staff for detecting faults in the network. A message is received from the OCU for each report and this is stored by the monitor unit 6 ready to printout. A cyclic buffer of 4K bytes is used and a print-out made when the buffer is ¾ full, a statistical print-out is made or by engineer request. To aid engineer interpretation of this data, the time to the nearest ¼ hour will be recorded for each difficulty call indicating the time when it was received by the monitor unit 6. Possible conflict may be dealt with in the same way as for statistical information.

Fault reports are generated by OCU's and peripherals when a malfunction occurs. The monitor unit 6 is designed to expect a maximum of 128 message types from the OCU and 128 types from the peripherals identifying the faults. The fault reports are used to increment 8 bit counts in an array of counts. Two arrays are used, one of OCU identity against message type and the other peripheral identity against message type. Each row and column will have associated with it threshold counts defining at what count a fault report ought to be recorded and brought to the maintenance engineer's notice. Normally the threshold counts will be fixed values, i.e. part of the programme. However to provide flexibility the engineer will be able to set variable threshold levels when required. Thus two sets of thresholds per array will be used, if the variable threshold is not in use the fixed threshold is used. To enable spurious signals to be regularly cleared, at midnight the two working arrays will be cleared and the counts transferred to the "History File." The engineer can control, via the teleprinter, the action taken when updating the History File at midnight. By instruction the programme will not simply overwrite the History File, but add the last 24 hour period to the existing History File counts enabling a set of counts over a number of days to be accumulated. The engineer can request a print-out of the existing History File at any time. To simplify reference to the two working arrays the engineer refers to a "device number" which defines a particular OCU or peripheral unit and a "message type." The first 128 types will be allocated to OCU's and the second 128 for peripherals. It can be useful for the engineer to access and control counts in "groups." These groups are defined by the device they relate to, e.g. rows of OCU file relating to a particular peripheral unit and the message from that peripheral unit (i.e. column in peripheral working file). Message counts can be printed, cleared and threshold set on a group basis in the same way as on a per row or column basis.

To provide further engineer control of thresholds a time controlled threshold facility is also provided, which enables the engineer to specify a threshold count over a timed period.

In certain situations the engineer will require to set specific count thresholds, e.g. a particular message report from a particular OCU. This threshold setting of single counts is provided in a limited way by using a separate list from the main working arrays.

If a threshold is reached the total count for the row or column is checked to see if other reports are being received from the OCU or peripheral (column check) or the same message type from different OCU's or peripherals (row check). If the row/column total count has reached double the threshold value, the appropriate fault report is generated.

Reports of satisfactory operation are received from each OCU and peripheral unit every 4 seconds. An 8 second time-out is set by the software and if the time-out expires before the next satisfactory report is received the appropriate message count is incremented. A threshold is set in exactly the same way as ordinary maintenance reports received from OCU's or peripherals.

When a fault report is generated the appropriate row or column is marked to indicate that a report has been generated. This ensures that if a further count in that row reaches the threshold another report is not generated.

Fault reports are recorded in a cyclic buffer in which the row or column number and the appropriate array (OCU or peripheral) is recorded. The buffer is large enough to ensure that generally it does not overflow. If the queue is full then the row or column is not marked to indicate a report has been generated, so that next time a report is received the threshold will once again be seen to have been broken and another attempt made to include the fault report in the cyclic buffer etc. Each report in the queue is allocated an appropriate reference number. This enables easy reference by the engineer. When a new fault report is included in the queue an alarm is set off. Depending on which row or column is being reported either a prompt or deferred alarm is generated. When the engineer requests the fault report list the alarms are removed.

Every ¼ hour the monitor unit 6 receives reports from both tariff peripheral equipment specifying the ¼ hour (number in range 0.95) and the date (day, month, year). If either message received is in error (parity check) or the two reports are more than 1 minute apart a fault report is generated in the same way as for threshold counts.

Figure 7:
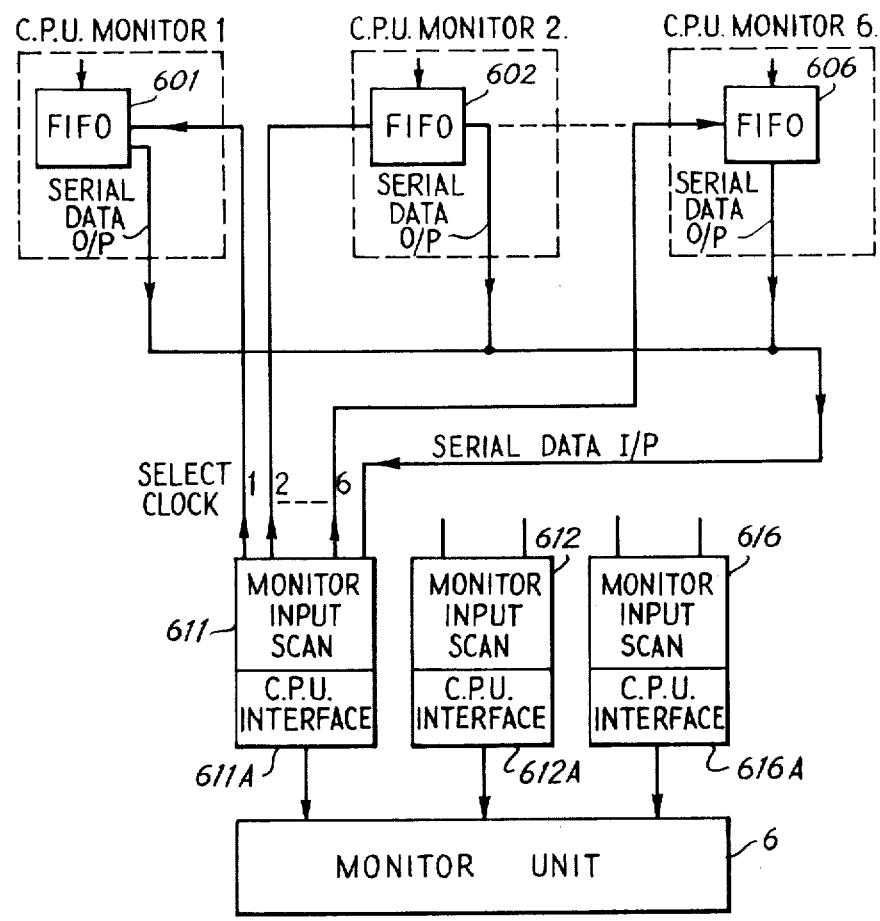
FIG. 7 shows the coupling of CPU monitor units to a monitor unit.

Some details of the connection of the CPU monitor units, such as 125 of FIG. 2, 204 of FIG. 3, 304 of FIG. 4 and 405 of FIG. 5, to the monitor unit 6 are shown in FIG. 7, from which it can be seen that the outputs from the CPU monitor units are stored in respective FIFO (first in, first out) buffers 601 to 606 which are read by scan signals from a monitor input unit 611. The monitor input units 611 to 616 each include a CPU interface 611A to 616A for presenting the data received to the data processor of the monitor unit 6.

The operations of the CPU's in the peripheral units are similar to that of the CPU in an OCU as described above with reference to FIG. 2, in that they are divided into a number of time slots which are allocated respectively to ports providing or requiring data. In the use of the peripheral units the ports include the input/output units, the watch-dog timer and the engineer's keys. The operations of the magnetic cartridge recording units also include the transfer of data to the magnetic recording units and the checking of the data to be recorded in each unit by reference to the data to be recorded in the other unit. Because the data rate which magnetic recording units can handle is relatively low compared with the speed of operation of the CPU, it is arranged that when the magnetic recording units are ready to receive data they interrupt the operation of the CPU and cause it to transfer the data selected to the magnetic recording units.

A typical routine for a telephone switchboard operator operating the equipment described above is as follows.

The method of call arrival to the switchboard operator will be unchanged and the operator will answer the call as she does at present. On accepting the call the operator will have the "Ordinary" class of service displayed, if the call has originated from a coinbox line the operator is able to change the class of service to "Coinbox" by operation of a "coin box" key. On operation of a "destination exchange/number" key the VDU in the OPE automatically displays the call tariff period in force. The "destination number" is keyed in national significant number format and displayed on the VDU. On operation of a "set destination" key a "stop time" key is automatically operated and the required number is sent into the network. The operator then records the originating exchange/number, again in national significant number format, and this is also displayed on the VDU. When the originating exchange/number is recorded the call charge step is automatically displayed on the VDU. As soon as the operator has verified that the call has been routed satisfactorily the "stop time" key is restored and an "automatic account" key may then be operated prior to the operator leaving the connect circuit. When the required number subsequently answers, timing is started automatically. At the end of the call, when both parties clear, the connections are automatically released from the switchboard and the call data, required to bring the call to account, is transferred to the magnetic tape cartridge leaving the connect circuit free to accept a new call.

The tariff period, charge step and originating line class of service are displayed in separate fields of the VDU but the originating and destination numbers are displayed in a common assigned field. The control of the assigned field is shared by a number of keys and a mnemonic is displayed in the first space of that field to indicate which key has control. When there are no keys operated, the assigned field displays the destination number if such has been recorded. The equipment can cater for an unlimited number of call procedures. Typical examples are Freefone calls, credit card, transfer charge, personal, advise duration and charge, and third party paying calls.

A substantial saving is envisaged in the operator handling time on calls as the average delay between the operation of keys and the display of data on the VDU is a fraction of a second. Call details, once recorded, are used for both routing and call recording purposes and can be used to make unlimited repeat attempts in setting up connections on either side of the connect circuit. The charging information, tariff rate and charge step, is derived automatically from the originating and destination exchange national codes. Routing to the required exchange is achieved where necessary by an automatic translation of the appropriate exchange code.

Although the operator has the overall control of call timing, in the majority of calls this will be undertaken automatically. For most calls, when both parties have replaced their handsets the equipment automatically performs its accounting function, and releases the connections leaving the connect circuit free to handle a new call. Normally once the operator has recorded all the call details and set up to the destination exchange she need have no further involvement in the call.

Although the invention has been described with reference to a specific embodiment used for recording details of manually connected telephone calls, it will be appreciated that it can equally well be embodied in data processing equipment for other purposes, such as, for example, airline seat reservations, banking and insurance use and stockbroking transactions.

Other features of the embodiment described herein form the subject of co-pending patent applications filed concurrently with this case, namely Ser. Nos. 773,178, 773,179 and 773,215. It will be understood that the invention claimed in this application can be used on its own or in conjunction with any of the inventions of the co-pending applications.

Other peripheral units than those described in the particular embodiment may be added to or substituted for those mentioned above. It will be appreciated that the number of units and lengths of time intervals given are by way of example only and these can be varied in any suitable manner.

We claim:

1. Data processing equipment having a plurality of on-line stations, the equipment including a data entry means and data utilisation means at each station, a plurality of data handling units, a main data storage unit, and a plurality of control units each including means for recording in response to the data entry means details of a required data processing operation, each control unit including means for generating in response to the recorded details interrogation signals for the data handling units, means for receiving data from the data handling units in response to the interrogation signals and recording the data, means for applying signals from the means for receiving data to the data utilisation means, and means for generating signals representing the data processing operation and applying them to the main data storage unit, wherein the main data storage unit includes two independent recording means each including a buffer store connected to receive signals from the control units, a data recorder, and a recorder control means for controlling the recording by the recorder of the signals stored in the buffer stores, and the means for generating signals representing the data processing operation is arranged to generate two separate signals which are respectively applied to the two independent recording means, the control means of each independent recording means including comparison and testing means arranged to compare the signals representing the data processing operation and stored in the buffer stores of the two recording means and to perform a test of the validity of the signals stored in the buffer stores, the control means being arranged to permit the recording of the signals stored in the buffer stores by the data recorder, if they are the same in both of the recording means.

2. Equipment according to claim 1 wherein the control means is enabled to permit both signals stored in the buffer stores to be recorded by the respective data recorders if both signals are found to be valid when tested, whether they are the same or different, and to permit the valid signal stored in one buffer store to be recorded by both data recorders if only the signal in the buffer store is found to be valid when tested.

3. Equipment according to claim 2 wherein the control means causes the data recorder to record an indication that the signals recorded by the two recording means differ or that one of the signals was found to be invalid.

4. Equipment according to claim 1, wherein each control means includes a central processing unit which performs the comparison and testing and the data recorder is arranged to interrupt the operations of the central processing unit to cause it to transfer signals from the buffer store when the data recorder is ready to receive signals.

5. Equipment according to claim 4 wherein the data recorder is arranged to receive blocks of data from the control means.

6. Equipment according to claim 5 wherein a "first in, first out" buffer store is provided in the data recorder for recording a block of data from the control means and the data recorder is arranged to record continuously from the "first in, first out" buffer store.

7. Equipment according to claim 1 wherein the data recorder is a magnetic cartridge or cassette recorder in which two detachable magnetic cartridges or cassettes with associated magnetic heads are provided so that when one cartridge or cassette is filled recording can be continued on the other whilst the filled one is changed.

8. Equipment according to claim 1 wherein each station is operable by an operator and the data utilisation means includes display means for displaying data from the data handling and/or storage units to the operator.

9. Equipment according to claim 8 used for recording details of telephone calls manually connected by the operator, the station including means for causing the application of signals for recording by the main data storage unit which can be operated by the operator on completion of a telephone call.

* * * * *